United States Patent [19]

Webb et al.

[11] 3,917,720

[45] Nov. 4, 1975

[54] CONTINUOUS PROCESS FOR THE PRODUCTION OF A DIOL FROM A DIOL ESTER

[75] Inventors: Jimmy L. Webb, Ballston Lake; John E. Corn; R. Thomas Swiger, both of Schenectady, all of N.Y.

[73] Assignee: General Electric Company, Pittsfield, Mass.

[22] Filed: May 30, 1973

[21] Appl. No.: 365,229

[52] U.S. Cl........... 260/635 R; 260/499; 260/637 R
[51] Int. Cl.².................... C07C 29/00; C07C 29/24; C07C 31/18
[58] Field of Search ............................... 260/635 R

[56] References Cited
UNITED STATES PATENTS

| | | | |
|---|---|---|---|
| 1,491,076 | 4/1924 | Burghart | 260/491 |
| 2,578,647 | 12/1951 | Stiteler et al. | 260/635 R |
| 2,862,962 | 12/1958 | Ulvild et al. | 260/491 |
| 2,985,637 | 5/1961 | Anselm et al. | 260/635 R |
| 3,098,093 | 7/1963 | Hagemeyer et al. | 260/491 |
| 3,239,569 | 3/1966 | Slaugh et al. | 260/491 |
| 3,328,439 | 6/1967 | Hamilton | 260/491 |
| 3,586,716 | 6/1971 | Yasui et al. | 260/635 R |
| 3,859,368 | 1/1975 | Kollar | 260/635 R |

*Primary Examiner*—Joseph E. Evans
*Attorney, Agent, or Firm*—William F. Mufatti; Donald M. Papuga

[57] ABSTRACT

A continuous process for the production of a diol from a diol ester by hydrolysis in the presence of an acidic cationic exchange material.

8 Claims, No Drawings

CONTINUOUS PROCESS FOR THE PRODUCTION OF A DIOL FROM A DIOL ESTER

This invention relates to a continuous process for the production of an ester-free diol from a diol ester by hydrolysis in the presence of an acidic cationic exchange material.

Background of the Invention

There are several methods for removal of ester groups from diols to produce the useful diol. Aqueous base hydrolysis is unacceptable in that molar quantities of carboxylic acid salts are produced which are soluble in water and somewhat soluble in the product diols. The isolated salt must then be converted to the carboxylic acid for recycle by strong acid, thus producing large quantities of useless salts.

In acid catalyzed hydrolysis, when an ester, water and an acid catalyst are mixed, an equilibrium is established which has a large amount of ester remaining in the mixture. Methods must be devised to shift the equilibrium in the desired direction, usually by removing one or more of the products selectively from the reaction mixture. Also, soluble acids pose potential problems since they would require neutralization yielding undesirable by-products.

Description of the Invention

It has been discovered that an ester-free diol is produced by a continuous process from a diol ester by hydrolysis in the presence of an acidic cationic exchange material. No undesirable by-products are produced.

Preferably, the instant continuous process for the production of an ester-free diol from a diol ester by hydrolysis at an elevated temperature comprises the steps of: (a) reacting a diol ester and water in a reactor in the presence of an acidic cationic exchange material to produce an equilibrium mixture of water, acid, a diol and a diol ester; (b) feeding the equilibrium mixture into a column where the acid and water are removed to produce a mixture of a diol and a diol ester; (c) feeding the mixture of a diol and a diol ester into a countercurrent extractor; (d) introducing water and an inert organic solvent into the countercurrent extractor to mix and contact with the mixture of the diol and the diol ester, producing an aqueous phase of the diol and a solvent phase of an unhydrolyzed ester; (e) separating the solvent from the aqueous phase of the diol to produce an aqueous solution of the diol; (f) passing the solvent phase containing the unhydrolyzed ester into a column to separate the organic solvent and the unhydrolyzed ester, which solvent is recycled to the countercurrent extractor of (d); (g) recycling the unhydrolyzed ester into the reactor of (a); (h) passing the aqueous solution of the diol from (e) into a column to remove the water and produce an ester-free diol.

The term a diol ester herein includes both a single diol ester and also a mixture of diol esters.

The method of this invention is applicable for continuously removing an ester group from a diol ester. This method may be used to continuously remove an acetate group from a diol acetate derived from the hydroformylation and hydrogenation of allyl acetate.

The hydroformylation and hydrogenation of allyl acetate is disclosed in copending applications Ser. Nos. 365,228 and 365,231 each filed May 30, 1973, titled A Process for the Production of Butanediol and assigned to the same assignee as the present invention. An acetate ester of a butanediol and an acetate ester of a propanediol formed by the hydroformylation and subsequent hydrogenation or by reacting allyl acetate with carbon monoxide and a catalyst at an elevated temperature and pressure may comprise in admixture at least nine compounds, i.e. the diol, the monoacetate and the diacetate of 1,4-butanediol, of 1,2-butanediol and of 2-methyl-1,3-propanediol.

The term a butanediol herein includes a mixture of isomeric butanediols.

This invention involves an improved process for de-esterifying a mixture comprising an acetate ester of a butanediol and an acetate ester of a propanediol obtained by the hydroformylation and hydrogenation of allyl acetate wherein the improvement comprises the steps of continuously (a) reacting the mixture of an acetate ester of a butanediol and an acetate ester of a propanediol with water in a fixed-bed reactor in the presence of an acidic cationic exchange material to produce an equilibrium mixture of water, acetic acid, diols and acetate esters of the diols; (b) feeding said equilibrium mixture into a column where the acetic acid and water are removed producing a mixture of diols and the acetate esters of the diols; (c) feeding said mixture of diols and the acetate esters of the diols into a countercurrent extractor column; (d) introducing water and an organic solvent into said countercurrent extractor column to mix and contact with the mixture of diols and the acetate esters of the diols thereby producing an aqueous phase of the butanediols and a solvent phase of unhydrolyzed acetate esters of the diols; (e) separating the solvent from the aqueous phase of the diols to produce an aqueous solution of the diols; (f) passing the solvent phase containing unhydrolyzed acetate esters of the diols into a column to separate the organic solvent and the unhydrolyzed acetate esters of the diols, which solvent is recycled to the countercurrent extractor of (d); (g) recycling the unhydrolyzed acetate esters of the diols into the fixed-bed reactor of (a); (h) passing the aqueous solution of the diols from (e) into a column to remove the water and produce an admixture of an ester-free diol.

When the process comprises forming ester-free diols from the acetate ester of a butanediol and the acetate ester of a propanediol, the product comprises in admixture 1,4-butanediol, 1,2-butanediol and 2-methyl-1,3-propanediol. The 1,4-butanediol is separated from the other diols by fractional distillation.

Any acidic cationic exchange material can be used within the scope of this invention. A preferable acidic cationic exchange material is an acidic cationic exchange resin. A preferred acidic cationic exchange resin comprises a sulfonated resin. A preferred sulfonated resin is a sulfonated polystyrene copolymer insoluble in the reaction medium, such as sulfonated styrene-divinylbenzene copolymer.

The process may be conducted at an elevated temperature from about 25°C. to about 90°C. A preferred temperature is about 75°C. If the temperature exceeds 90°C., an excessive amount of by-products is formed. Pressure in the process is not critical and may be in the range from sub-atmospheric to elevated pressure.

The amount of water which may be used in this process may vary from about 1 mole to about 50 moles per mole of the diol esters.

The inert organic solvents which can be used within the scope of this invention are solvents which dissolve the unhydrolyzed acetates, are immiscible with water and the diols, such as benzene, chloroform, diisopropyl ether, etc.

The reactors, countercurrent extractors and columns used in the process of this invention are well known in the art. A preferred reactor employed herein being a fixed-bed reactor. Although the type of reactors themselves are not important, the sequence of steps (a) through (h) is critical.

Description of the Preferred Embodiments

The following Examples are set forth to illustrate more clearly the principle and practice of this invention to those skilled in the art. Unless otherwise specified, where parts or percents are mentioned, they are parts or percents by weight.

Example 1

A diol acetate mixture (20 ml.) containing 16.8% of 1,4-butanediol, 75.8% of 1,4-butanediol monoacetate and 7.4% of 1,4-butanediol diacetate and 140 ml. of water is passed through a 7.0 g. bed of an acidic cationic exchange resin which is a sulfonated polystyrene copolymer (approximately 8% divinylbenzene), mesh size 16–50, with an exchange capacity of 4.73 meq./g. (dry) held at 72°C. at a rate of 0.33 ml./min. Analysis of the effluent shows the reaction has reached equilibrium. This effluent is an admixture of water, acetic acid, diol, and diol acetates. The diol and diol acetates are separated from the admixture, analyzed and found to be composed of 67.3% of 1,4-butanediol, 30.3% of 1,4-butanediol monoacetate and 2.4% of 1,4-butanediol diacetate.

The effluent from the cationic exchange resin bed is fed into a 2 inch diameter molecular still to flash off the water and acetic acid. The resulting acetic acid free diol acetate mixture is passed to a chloroform/water countercurrent extractor at 25°C. Flow rates are such that one volume of diol acetates is partitioned between one volume of water and one volume of chloroform. The aqueous phase from the countercurrent extractor contains ester-free diol and the chloroform phase contains unhydrolyzed 1,4-butanediol monoacetate and 1,4-butanediol diacetate. The chloroform phase is fed to a 2 inch stripping still where the chloroform is removed and recycled to the countercurrent extractor. The unhydrolyzed esters are recycled to the cationic exchange resin bed. The aqueous phase from the countercurrent extractor is fed to a 2 inch stripping still where the water is removed to yield ester-free 1,4-butanediol.

Example 2

The system described in Example 1 is operated without the stripping still between the cationic exchange resin bed and the countercurrent extractor. The aqueous phase coming from the countercurrent extractor now contains acetic acid in addition to ester-free 1,4-butanediol, since the acetic acid has not been removed prior to the extraction process in said stripping still. Thus, when the mixture of 1,4-butanediol and acetic acid is heated in the final stripping still, re-esterification occurs and the 1,4-butanediol produced is contaminated with 5–10% butanediol monoacetate.

Example 3

The system described in Example 1 is operated using the mixture of diol esters obtained from the hydroformylation and hydrogenation of allyl acetate. This produces in admixture 1,2-butanediol, 1,4-butanediol and 2-methyl-1,3-propanediol in the final step. Pure 1,4-butanediol is obtained from this diol mixture by fractional distillation.

Example 4

The system described in Example 1 is operated using a mixture of diol esters obtained from the hydroformylation and hydrogenation of allyl acetate. A portion of this material is drawn off just prior to entering the countercurrent extractor. The diol acetate mixture, free of water and acetic acid, is carefully distilled through a 24 inch spinning band column at a pressure of 0.5 mm. mercury. No rectification occurs under these conditions. Repeated attempts to obtain diols from the diol acetates by distillation all failed. Thus, a distillation step cannot be substituted for the countercurrent extraction step.

Example 5

The system described in Example 1 is operated using benzene instead of chloroform in the countercurrent extractor. The products produced are the same as in Example 1.

Example 6

The system described in Example 1 is operated using diisopropyl ether instead of chloroform in the countercurrent extractor. The products produced are the same as in Example 1.

It can be seen that the sequence of steps (a) through (h) is critical. From Example 2, it is demonstrated that if step (b), i.e., the column, is eliminated, then the aqueous phase from the countercurrent extraction (steps c through e) contains acetic acid which would re-esterify the diol on distillation in step (h), thus contaminating the product with ester. Also, it is demonstrated in Example 3 that the countercurrent extraction step separates the diols from the acetates, and since the diols and diol ester mixture cannot be rectified by distillation alone as shown in Example 4, the countercurrent extraction step is necessary.

It should, of course, be apparent to those skilled in the art that changes may be made in the particular embodiments of the invention described which are within the full intended scope of the invention as defined by the appended claims.

What is claimed is:

1. A continuous process for the production of an acetate-free diol from a lower alkane diol acetate by hydrolysis which comprises the steps of:

a. reacting a lower alkane diol acetate and from about one to about 50 moles of water per mole of the diol acetate in a reactor at a temperature of from about 25°C to about 90°C in the presence of an acidic cationic exchange material to produce an equilibrium mixture of water, acetic acid, a lower alkane diol and a lower alkane diol acetate;

b. feeding the equilibrium mixture into a column where the acetic acid and water are removed producing a mixture of a lower alkane diol and a lower alkane diol acetate;

c. feeding the mixture of a lower alkane diol and a lower alkane diol acetate into a countercurrent extractor;

d. introducing water and an inert organic solvent which dissolves the unhydrolyzed acetates and is immiscible with water and the diols into the countercurrent extractor to mix and contact with the mixture of the diol and the diol acetate, producing an aqueous phase of the diol and a solvent phase of an unhydrolyzed acetate;

e. separating the organic solvent from the aqueous phase of the diol to produce an aqueous solution of the diol;

f. passing the solvent phase containing an unhydrolyzed acetate into a column to separate the organic solvent and the unhydrolyzed acetate, which solvent is recycled to the countercurrent extractor of (d);

g. recycling the unhydrolyzed acetate into the reactor of (a);

h. passing the aqueous solution of the diol from (e) into a column to remove the water and produce an acetate-free diol.

2. The process of claim 1 wherein the diol ester comprises in admixture the acetate ester of a butanediol and the acetate ester of a propanediol.

3. The process of claim 1 wherein the ester-free diol comprises a butanediol.

4. The process of claim 1 wherein the acidic cationic exchange material is an acidic cationic exchange resin.

5. The process of claim 4 wherein the acidic cationic exchange resin comprises a sulfonated polystyrene copolymer insoluble in the reaction mixture.

6. In an improved process for de-esterifying a mixture comprising an acetate ester of a butanediol and an acetate ester of a propanediol obtained by the hydroformylation and hydrogenation of allyl acetate wherein the improvement comprises the steps of:

a. reacting the mixture of the acetate ester of a butanediol and the acetate ester of a propanediol and from about 1 mole to about 50 moles of water per mole of the diol ester in a tower reactor at a temperature of from about 25°C to about 90°C in the presence of an acidic cationic exchange resin to produce an equilibrium mixture of water, acetic acid, diols and acetate esters of the diols;

b. feeding said mixture into a column where the acetic acid and water are removed producing a mixture of diols and the acetate ester of the diols;

c. feeding said mixture of the diols and the acetate esters of the diols into a countercurrent extractor column;

d. introducing water and an organic solvent which dissolves the unhydrolyzed acetates and is immiscible with water and the diols into said countercurrent extractor column to mix and contact with the mixture of the diols and the acetate esters of the diols thereby producing an aqueous phase of the diols and a solvent phase of the unhydrolyzed acetate esters of the diols;

e. separating the organic solvent from the aqueous phase of the diols to produce an aqueous solution of the diols;

f. passing the solvent phase containing unhydrolyzed acetate esters of the diols into a column to remove the organic solvent to produce the unhydrolyzed acetate esters of the diols and the solvent, which solvent is recycled to the countercurrent extractor of (d);

g. recycling the unhydrolyzed acetate esters of the diols into the tower reactor of (a);

h. passing the aqueous solution of the diols from (e) into a column reactor to remove the water and produce in admixture a butanediol and propanediol.

7. The process of claim 6 wherein the acidic ion exchange resin comprises a sulfonated polystyrene copolymer insoluble in the reaction medium.

8. The process of claim 7 wherein the sulfonated polystyrene copolymer is a sulfonated styrene-divinylbenzene copolymer.

* * * * *